United States Patent [19]

Bergeron, Jr.

[11] Patent Number: 4,505,325
[45] Date of Patent: Mar. 19, 1985

[54] AIR CIRCULATION SYSTEM FOR GENERALLY ENCLOSED STRUCTURES

[75] Inventor: Hervin J. Bergeron, Jr., Opelousas, La.

[73] Assignees: Stephen J. Ledet, Jr., St. Landry Parish, La.; James Donald Elder, Calcasieu Parish, both of La. ; part interest to each

[21] Appl. No.: 54,659

[22] Filed: Jul. 3, 1979

[51] Int. Cl.³ ............................................. F28D 17/00
[52] U.S. Cl. ...................................... 165/45; 165/53; 165/57
[58] Field of Search ........................ 62/2; 165/50–54, 165/18, 45, 48, 57; 237/1 R; 126/400

[56] References Cited

U.S. PATENT DOCUMENTS

| | | | |
|---|---|---|---|
| 2,828,681 | 4/1958 | Smith | 62/2 |
| 3,236,061 | 2/1966 | Wells | 62/285 |
| 3,415,024 | 12/1968 | Kotlarz | 165/53 X |
| 3,534,810 | 10/1970 | Limoni | 165/53 |
| 3,758,748 | 9/1973 | Reid | 165/45 |
| 3,983,929 | 10/1976 | Thomason et al. | 165/50 |
| 4,054,246 | 10/1977 | Johnson | 126/400 |
| 4,089,142 | 5/1978 | Kachadorin | 165/45 |
| 4,139,321 | 2/1979 | Werner | 237/1 R |
| 4,173,304 | 11/1979 | Johnson | 126/43 U |

Primary Examiner—Stephen F. Husar

[57] ABSTRACT

An improved heat transfer and air circulation system for homes and like constructions wherein heat is removed from the home or like construction and stored for later utilization. The system utilizes a blower with a non-conductive aggregate structural circulation medium supporting the home and transmits circulating air from the home to the area adjacent the underlying soil mass thereby providing an effective and workable heat transfer thermal cap system for use under the floor or slab portion of a home to be heated or cooled.

30 Claims, 10 Drawing Figures

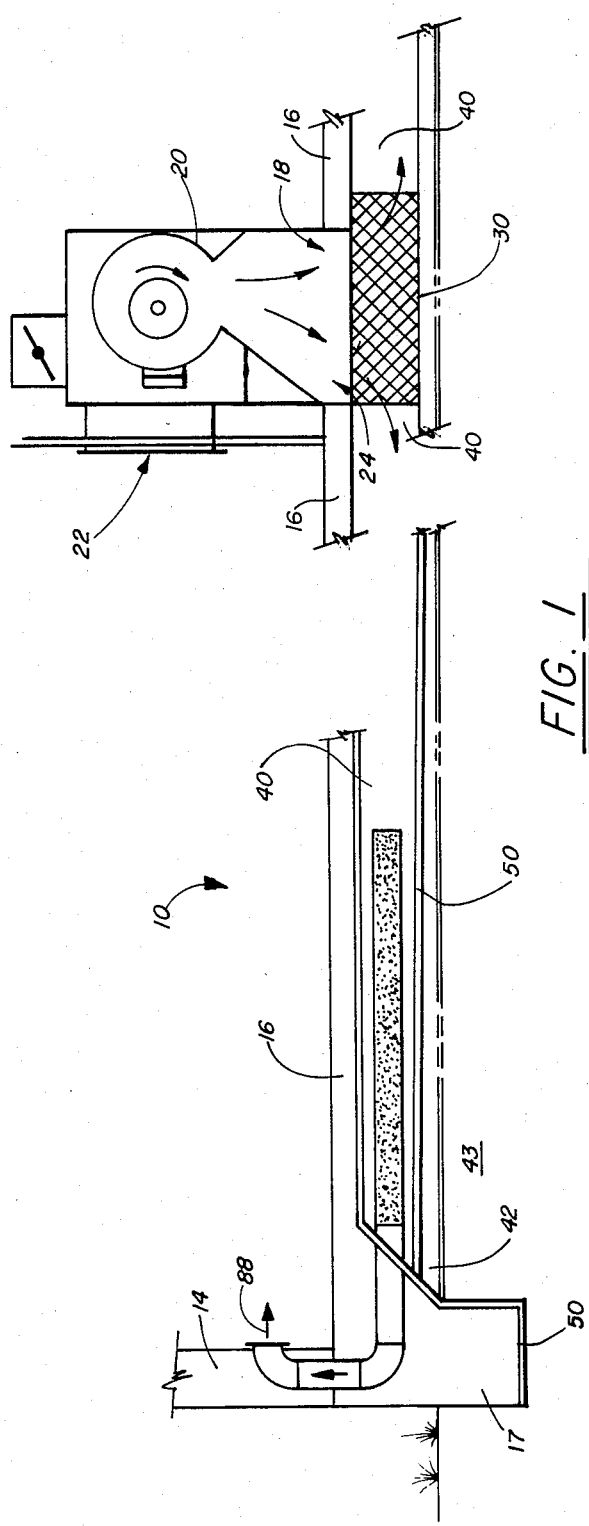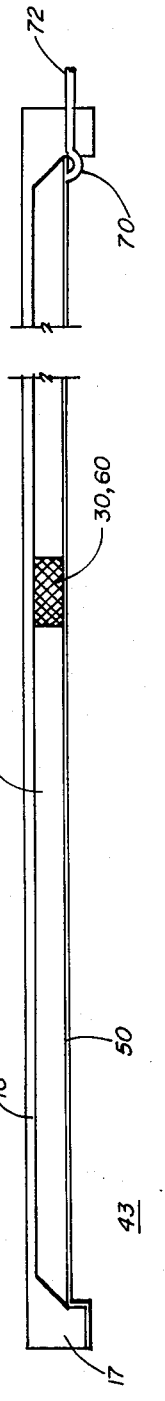
FIG. 1
FIG. 2

AIR CIRCULATION SYSTEM FOR GENERALLY ENCLOSED STRUCTURES

BACKGROUND OF THE INVENTION

1. Field of the Invention

The present invention relates to air circulation systems for generally enclosed structures such as homes having a floor and wall portion.

The present invention more particularly relates to an improved heat transfer and air circulation system for homes and like constructions wherein heat is removed from the home or like construction and stored for later utilization, with a non-conductive aggregate structural circulation medium supporting the home and transmitting circulating air from the home to the area adjacent the underlying soil mass.

2. General Background and Prior Art

In homes and other like constructions, fossil fuels or other energy is spent usually in the form of generated electricity for heating and cooling of the home. Thus, the average home requires energy which is ever shrinking and ever more expensive for its comfortable climate control.

Thus, there is a need for a more efficient system for heating and cooling the home which will allow it to more efficiently and less expensively be temperature controlled without the excessive use of electricity, fossil fuels, or other consumed energy.

Most homes are of a slab type construction, meaning that the home sits on a probably four to six inch thick mass of concrete, which is poured on the ground and some distance below in many cases which provided a structural support for the home. Other secondary support such as piling can communicate with the slab to provide a structural base which will not sink under the load of the home and the slab itself.

In most climates, in the ground immediately under the slab is a temperature fluctuation which often times is directly variable with the temperature of the atmosphere around the home yet coincident with the desired temperature in the home. For example, during the heat of the day the soil beneath the home is usually many degrees cooler. Further, in the winter the outside air is usually much cooler than the ground many inches or feet below the ground surface. Indeed, it is recognized that a "frost line" exists below which pipes and other matter will not freeze.

In a like manner, many inches or feet below the slab of the home that cooler temperatures that exist than in the atmosphere of the home in the mid day heat. Usually, the earth or soil at the frost line is constant temperature year round.

It would thus be desirable to circulate air through a medium provided below the home to the earth at the frost line area and return it to the inside of the home to either supplement the existing cooling system in the home or provide the total cooling system therefor. In winter, heating could be accomplished by circulating air taken from the home to the relatively constant temperature earth in the "frost line" region, and returning it to the homes interior.

Many prior art type devices have been patented, which have attempted to solve the problem of air circulation and climate control within homes and similar inhabitable constructions. Many of these devices have provided a medium of some sort beneath the home through which air can be circulated and heat transfer effected.

In U.S. Pat. No. 2,828,681 issued to Harry F. Smith, there is provided "Air Conditioning Apparatus". The Smith device depends on an impervious strata and a porous strata. A shaft is provided which is sunk into the strata approximately three feet above the water level, which shaft is combined with an air pump for the purpose of drawing out air from the sub strata. Other shafts are placed about the outlet shaft for the purpose of allowing air to circulate inwardly. One concept of this patent is to draw air for the room or areas to be cooled within a home or similar construction, pump the air down through the strata to outlets from which the resulting air is delivered to the rooms or areas as cool air in the summer. The heat so absorbed by the strata is stored there for winter heating.

In U.S. Pat. No.: 2,167,878 issued to R. B. Crawford and entitled "Air Conditioning System", there is provided a device directed to the problem of obtaining refrigeration or heating from the earth or ground water. The Crawford device provides a conduit or channel which is lined with precast concrete blocks and has openings 11, which allow water to gravitate into the artificial channel. Flow lines circulate the fluid while a pump pumps the fluid therethrough.

In U.S. Pat. No.: 2,559,870 issued to F. W. Gay, there is provided a "House Heating System" which utilizes a fan for circulating air through ducts which collect air beneath the basement of the house structure. Separate compartments are defined by I-beams with the I-beams being inter connected so as to provide a single air space from side to side underneath the house.

Another patent issued to F. W. Gay is U.S. Pat. No.: 2,584,573 entitled "Method and Means For House Heating". This latter Gay patent attempts to supply solar heat to a ground storage chamber thereby increasing the amount of stored heat available for heat pump operation in very cold winter weather.

A further patent issued to F. W. Gay is U.S. Pat. No.: 2,780,415 entitled "Heat Pump Operated System For House Heating". A heat stored area is provided beneath the house in this patent which provides a number of trenches traversed by a perforated water pipe embedded in gravel with which each trench is filled.

In U.S. Pat. No.: 2,793,509 issued to V. I. Keen and entitled "Method of an Apparatus For Cooling Inhabitable and Other Enclosures", there is provided a plurality of air conveying pipes which communicate with an artificial bed as a heat exchanger. The air is drawn through the conveying pipes to affect a heat exchanging.

A further patent directed to the problem of cooling structures by circulating beneath the building is provided in U.S. Pat. No.: 2,829,504 issued to R. C. Schlichtig entitled "Air Conditioning System for Dwellings". An air well is constructed beneath a building unit through which air is flowed for heat exchanging.

In a recent U.S. Pat. No.: 4,051,891 issued to Henry Harrison and entitled "Heat Transfer Block Means", a blower is provided which circulates air through a block structure that consists of a plurality of substantially equally sized stones. The stones are grouted or cemented together.

Some prior art devices require complex structural support for the home or construction. Others do not have adequate detention time provided by their circulation medium for the circulated air to effect proper heat transfer.

In the heat transfer media provided or suggested by some prior art devices/systems, heat conductive material is used, allowing premature heat transfer before air currents reach the underlying earth creating "hot spots" in the circulation medium.

Some systems do not properly insulate the frost line area of the underlying soil to provide a "thermal cap" between the supported structure and the relatively constant temperature frost line area soil mass.

A heating/cooling of the floor area which contacts critical human extremities (as feet) is not achieved by prior art devices without supplemental conventional heating or cooling.

3. General Discussion of the Present Invention

The present invention soles the prior art problem and shortcomings in a very simple and inexpensive manner by providing an effective and workable heat transfer thermal cap system for use under the floor or slab portion of a home to be heated and cooled. The present inventon provides an air circulation system for use with generally enclosed structures, such as homes and the like having at least enclosing walls and roof. The apparatus provides a blower for circulating air between the enclosed structure interior and a provided void air space. A preferably aggregate mass of relatively non-conductive, structural air circulation material is provided under the slab portion of the structure continuously communicating with the earth frost line area over substantially its entire area. The circulation mass provides structural support to the home or like construction with the uppermost portion of the aggregate mass supporting at least a portion of the slab of the enclosed structure and communicating therewith. A water barrier film sheet envelope surrounds the aggregate mass and prevents water flow into the aggregate mass from the surrounding area. A plurality of air return lines are mounted in the aggregate mass, each providing a fluid conveying conduit having a discharge port at one end portion thereof communicating with the inside portion of the enclosed structure and an intake portion mounted in the aggregate mass for collecting air within the aggregate mass and transmitting that air through the conduit to the discharge port under the urging of the blower. In the method of the present invention, there is provided an aggregate mass on the underside of an enclosed structure which aggregate mass communicates over substantialy its entire area with both the floor/slab portion of the building being supported and cooled as well as with the frostline portion of the earth therebelow. Air is collected in the aggregate mass in a plurality of balanced flow independent air return lines. Air is pumped from the inside of the generally enclosed structure through an opening in the floor portion thereof to the aggregate mass and circulated through the aggregate mass. Heat is transferred from the circulated air to the area below the frostline which communicates with the aggregate mass and returned air which is cooler (having transferred heat to the frostline portion of the earth and to the slab/floor).

Means is provided for collecting heat from various heat producing elements within the structure, such as fireplaces, dryers, oven, stoves, and the like. Such collected heat can be connected by means of ducts, conduits, or the like to the blower intake portion for subsequent and immediate circulation into the aggregate mass.

It is an object of the present invention to provide a heat transfer system which evenly distributes collected heated or cooled air through to an aggregate mass for even heat transfer to the earth generally beneath the aggregate mass and frostline.

It is another object of the present invention to provide a heat transfer system in which the aggregate mass also structurally supports the building to be heated or cooled.

It is another object of the present invention to provide a heat transfer system which is simple and easy to construct and easy to maintain.

It is another object of the present invention to provide a heat transfer which collects wasted heat generated by various heat producing units within the home or like construction such as the fireplace, stove, oven, dryer, and the like, and transfer this heat to the area in the earth generaly at or beneath the frostline for later utilization during the winter.

It is another object of the present invention to provide an apparatus for collecting wasted heat within the home and transfer the excess wasted heat to a blower for transfer to the storage area provided beneath the home.

It is another object of the present invention to provide an insulated thermal cap between the home to be heated and cooled and the earth beneath the frostline whereby heat can be added or taken away from the relatively constant temperature earth beneath the frostline for use in the home as needed.

It is another object of the present invention to provide an air circulation medium beneath the home and communicating with the slab/floor portion to maintain a desirable temperature in the slab/floor region.

It is another object of the present invention to provide a heat transfer means which is easy to construct and which evenly transfers and distributes heat without excessive hot spots or localization of heat buildup.

It is another object of the present invention to provide a thermal cap heating and cooling construction for use with homes and like constructions which reduces the cost of heating and cooling of the structure to save energy and money as compared with conventional heating and cooling systems.

It is another object of the present invention to provide a heating and cooling transfer system which eliminates attic duct work as provided in conventional heating and cooling systems.

It is further object of the present invention to provide a heat exchange system which can incorporate a fire alarm, fire reporting system, and purification and/or deodorizing system for use with an overall air circulation system.

It is still a further object of the present invention to provide an air circulation path which moves through a controlled temperature circulation medium at or near an ideal comfortable temperature level, negating the chance for undesirable heat or cooling loss to the ambient air.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a partial sectional view of the preferred embodiment of the apparatus of the present invention illustrating the blower, circulation medium, and return air line portions thereof;

FIG. 2 is a sectional view of the slab portion of a conventional home with the circulation medium and apparatus of the preferred embodiment of the present invention as shown as associated therewith;

FIG. 6A is a sectional view taken along lines 6A—6A of FIG. 6A;

DETAILED DESCRIPTION OF THE PREFERRED EMBODIMENT

Figure 4:
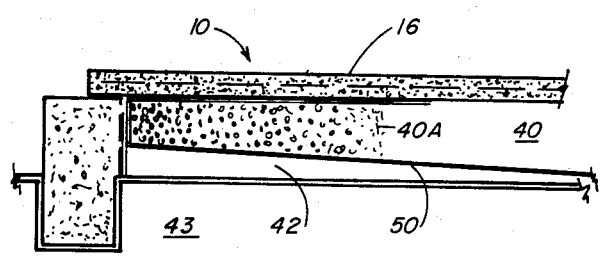
FIG. 4 is a sectional view taken along line 4—4 in FIG. 3.
Figure 5:
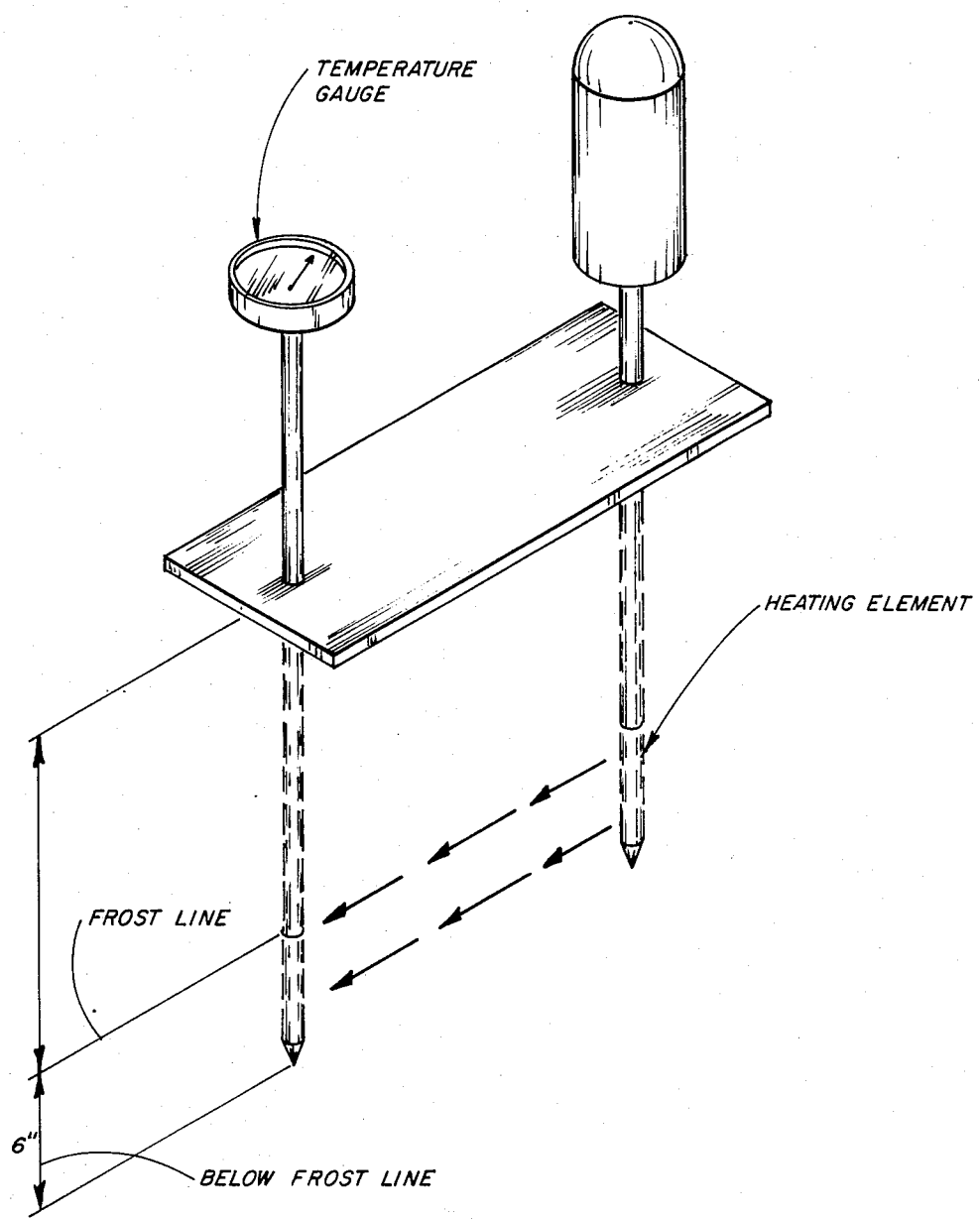
FIG. 5 is a perspective view of the heat storage capacity tester as used with the preferred embodiment of the present invention.

FIGS. 1 and 4 provides a partial sectional view of the preferred embodiment of the apparatus of the present invention designated generally by the numeral 10. In FIG. 1 there can be seen a home or other generally enclosed structure having wall 14 portions a slab 16 portion in the partial view. It should be understood that walls 14 and slab 16 are only partially shown for illustration and the enclosed structure would likewise have a plurality of outer walls, inner walls, a roof and a continuous slab as is known in the art. An opening 18 is provided in slab 16 at blower 20. Blower 20 provides intake 22 and discharge 24 portions. Discharge 24 is attached to slab 16 at opening 18 and it will be understood that air is circulated generally from intake 22 through blower 20 through discharge 24 and opening 18 to the area beneath slab 16. A screen box 30 is provided at opening 18 which as will be described more fully hereinafter prevents the accumulation of aggregate mass 40 from blocking or otherwise encumbering the flow of air at opening 18. Perimeter wall 17 could support slab 16 and contain aggregate mass 40.

An expanded clay lightweight aggregate mass air circulation medium 40 is provided beneath slab 16. Preferably, a one half to three quarter inch grain size would be provided to each particle or each individual element of material forming expanded clay lightweight aggregate mass 40. Each grain would be preferably highly irregular having an irregular surface with the surface area approximtely double that of a symmetrical surface for similar size. An approximate specific gravity of two would be suitable. Expanded clay lightweight aggregate mass 40 would be preferably non absorbant and non toxic as well as odorless. A 5% activated charcoal content could be added for enhanced filtration. The material would have a high "R" factor and be non conductive. When air is not in motion, the area below slab 16 becomes an insulated area with little heat transfer between slab 16 and soil mass 43 or sand layer 42. Such a grain size in a mass would be a structural material in which the expanded clay lightweight aggregate mass would be used in an air circulation and heat transfer system. Preferably a one third solids to two thirds air space would be provided for as a volume specification.

A suitable lightweight aggregate for structural concrete or lightweight aggregate for concrete masonry units would be suitable as a material for expanded clay lightweight aggregate mass 40. Such a material is seen in the American Society for Testing and Materials, ASTM standards, especially ASTM designation C331-64T and AST M designation C330-68T. ASTM designation C331-64T and ASTM designation C330-68T are specifications incorporated herein by reference.

An expanded clay lightweight aggregate mass 40 as above described and specified is a material which is extremely suitable for structural support of a home or other structure including the slab 16 portion thereof. At the same time, it has been found that such aggregate mass 40 is a suitable filter material while having characteristics which provide excellent air purification and a grain size of three quarter inch to one inch allows easy flow of air through mass 40 which is deposited beneath slab 16. In FIG. 1, a mass 40 of expanded clay lightweight aggregate is provided above sand layer 42. Sand layer 42 could be for example a few inches in thickness and provides a further firm base upon which slab 16 and mass 40 can be rested. Sand 42 layer is not essential, but can be used as a grading material to set the desirable slope for film layer 50 which produces proper water flow (once collected by mass 40 and drained by gravity to film layer 50).

A film layer 50 of preferably black VISQUEEN ® or other suitable water impervious plastic material envelops mass 40 and separates it from slab 16 and from soil mass 43 or sand layer 42. Plastic film sheet envelope 50 would for example be of double thickness six mil VISQUEEN ® film and would act as a barrier for preventing encroachment of water into medium 40. In the preferred embodiment, circulation mass 40 could be approximately eight inches thick at the edge 42 portions of medium 40 and preferably 12 inches at the center thereof providing a slope to the center. Film sheet layer 50 would also be a ground water barrier. In FIG. 2 there can be seen slab 16, medium 40, VISQUEEN ® or plastic film layer 50 below which would be soil mass 43 or sand mass 42. Note that medium 40 supports slab 16 and communicate therewith. Since air flowing in medium 40 will be at or near an ideal temperature, slab 16 will be heated or cooled accordingly by heat transfer from medium 40 giving a pleasing temperature to floor/slab 16 for walking on, even with bare feet in extreme outside temperature months.

At the central portion of medium 40 is provided a water drain lintel box 60. In the preferred embodiment, lintel box 60 would be of a screen mesh material which would allow water to drain freely through medium 40 on top of plastic layer 50 to lintel box 60. The lower portion of lintel box 60 would provide a drain pipe 70 (see FIG. 7) which would discharge water collected therein to the outside portion of slab 16 at effluent 72. Lintel box 60 and screen box 30 could be one and the same.

Figure 3:
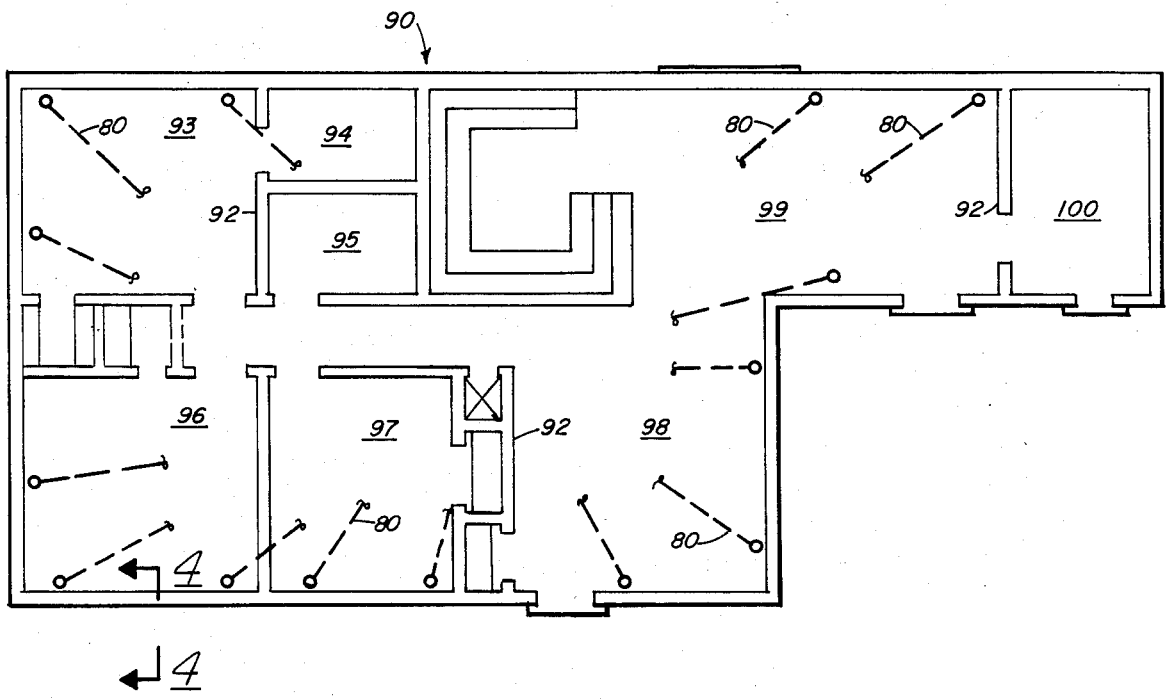
FIG. 3 is a plan view of a typical generally enclosed structure such as a home showing the air return line portions of the preferred embodiment of the apparatus of the present invention and their placement therethrough.

In FIG. 3 there can be seen a plan view of a typical home or other generally enclosed structure designated by the numeral 90. In FIG. 3 a plurality of inner walls 92 divides structure 90 into separate rooms 93-100. In FIG. 3, schematically illustrated are a plurality of return lines 80. Each return line 80 is shown as it is placed under slab 16 through circulation medium 40. Lines 80 so placed will allow air to be discharged into structure 90 at desired points and in desired volumes for a balanced air flow system. In FIG. 3 there can be further seen schematically illustrated the placement of blower 20 at the central portion of structure 90 with the intake 22 portion thereof also schematically illustrated. It will be appreciated from the above description that air flow will be generally from blower 20 downwardly through slab 16 and discharge opening 18 through screen 30 to continuous circulation aggregate mass 40. Thereafter, air will intermix with aggregate mass 40 and heat transfer as well as filtration will take place. Since air flow generated by blower 20 will be furnished at for example 1200 to 2000 cubic feet per minute, the openings 81 provided through each air return line 80 will allow for the return of air therethrough as shown by arrows 88 in FIG. 1.

Figure 7:
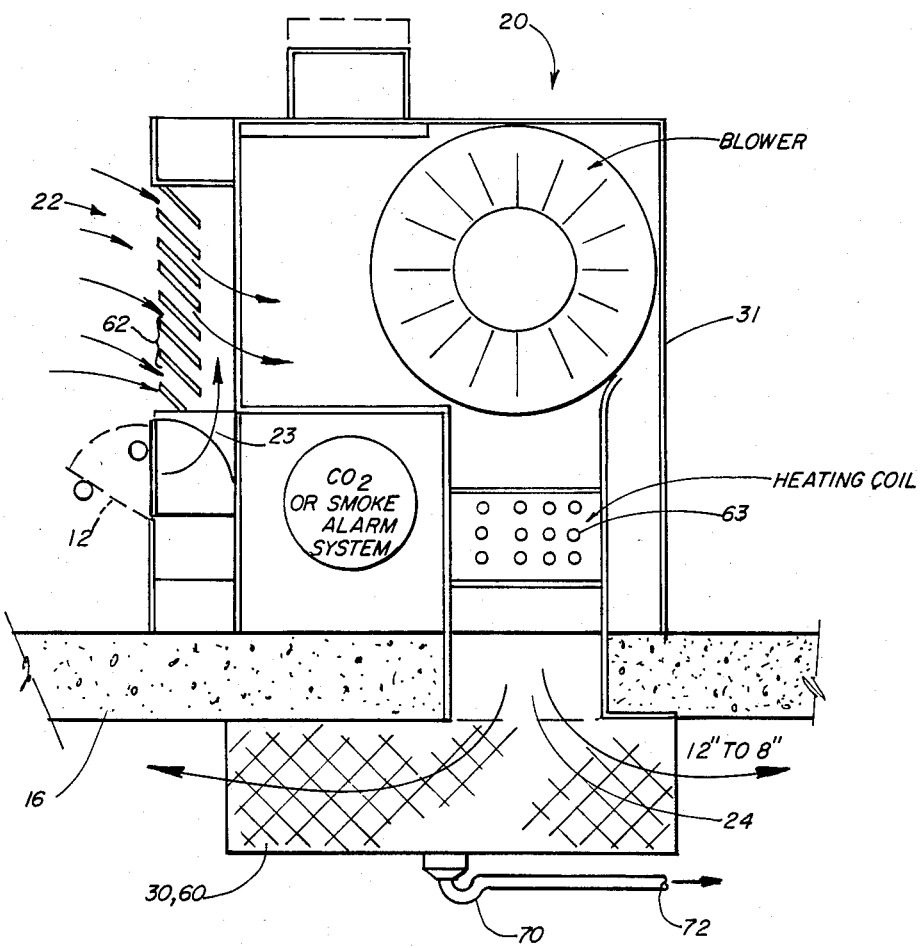
FIG. 7 is a detail of the blower and intake chamber portion of the preferred embodiment of the apparatus of the present invention.

FIG. 7 more particularly shows the construction of blower 20. Blower 20 is housed in a blower chamber 31, which provides intake 22 and discharge 24 portions. Louvers 62 can be provided to control the volume of air intake as desired. A draft box indicated generally by the numeral 12 can be provided into which could be placed any desirable aromatic, medicinal, or like chemical substance which would intermix with air traveling through intake 22 as indicated by arrow 23 in FIG. 7.

As aforementioned, supplementary heating in the form of coils 63 could be provided at discharge 24. A carbon dioxide or like smoke alarm system could be provided to blower 20 which could be injected at discharge 18 for subsequent entry into the home in the event of fire.

Figure 8:
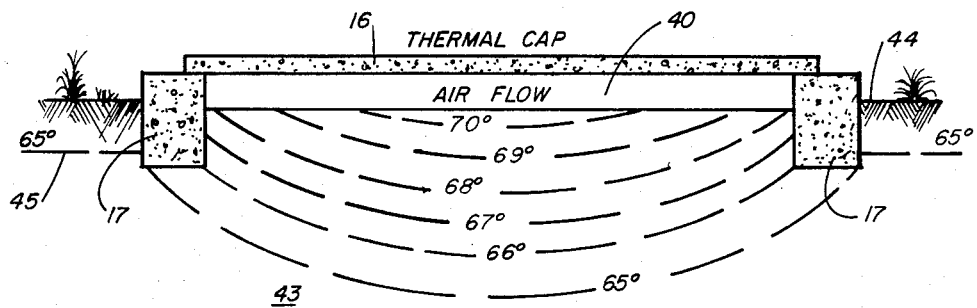
FIG. 8 is a sectional schematic illustration of the thermal cap-frostline as relates to the preferred embodiment of the apparatus of the present invention.

In FIG. 8, there is seen schematically the thermal cap portion of the preferred embodiment which is provided under slab 16 and above soil mass 43 at ground surface 44. Frost line 45 is also schematically illustrated to indicate that a relatively constant temperature is provided at soil mass 43 of for example, between 65 and 70 degrees.

It should be understood that soil mass 43 beneath mass 40 will be of relatively constant temperature year round. Normally, an excavation would be made depending on the depth of the frost line in a particular area to provide a space within which circulation mass 40 will be placed. Slab 16 will be placed on top of circulation mass 40 and be structurally supported thereby. Peripheral walls 17 as above discussed would provide peripheral support to slab 16 and containment of mass 40 at the side portions. Thus, an overall thermal cap is provided between slab 16 and soil medium 43 which controls and keeps constant the temperature as desirable of the soil mass 43. Since mass 40 is structural, it supports slab 16. Since mass 40 is relatively nonconductive, air circulated into mass 40 will heat transfer at soil mass 43 and at slab 16. During periods of high humidity, as in summer months water will accumulate on individual particles 40a of medium 40 which will be a spot for heat transfer and some heat transfer will be affected at particles 40a in that instance. Since the air circulation medium 40 is contained under and within slab 16 and peripheral wall 17 and above soil mass 43 and communicating therewith, a relatively constant temperature thermal cap is provided through which air will flow on a year round basis. Thus, the intake air during extreme months will not be ambient air as is the case with conventional systems. For example, if outside temperature is zero degrees Fahrenheit, a heating unit must take zero degree air and transform it into sixty eight degree Fahrenheit air or seventy degree Fahrenheit air, etc. With the present invention, ambient air is not needed, but rather the blower circulates air into the relatively constant temperature thermal cap provided through circulation medium 40 and as above described, thus air entering medium 40 will be at or near an ideal temperature with very little transfer needed, since the air is not ambient, but only needs to be heated or cooled on the order of five to twenty degrees Fahrenheit as exemplary.

Figure 6:
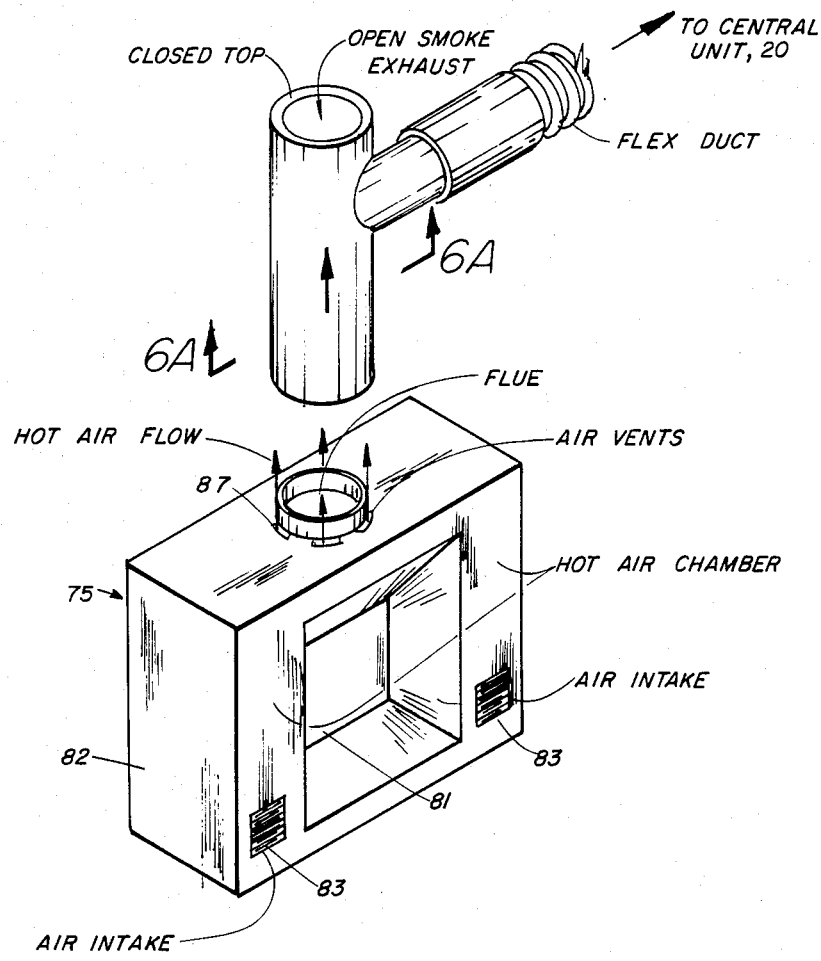
FIG. 6 is a partial perspective view of the fireplace excess heat collection unit as used with the preferred embodiment of the apparatus of the present invention.
Figure 9:
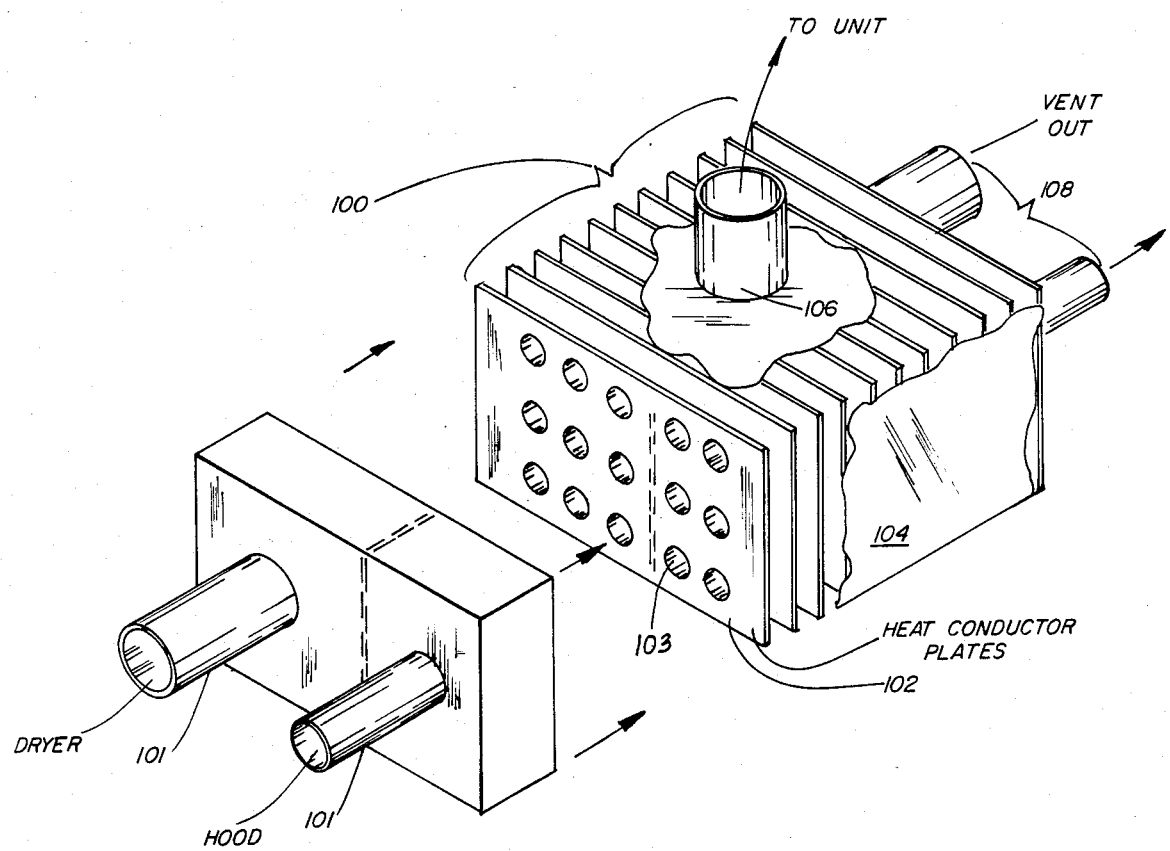
FIG. 9 is a partial sectional view of the excess heat collection assembly portion of the preferred embodiment of the apparatus of the present invention.

FIGS. 6 and 9 provide devices which could be used with the preferred embodiment of the apparatus of the present invention to further enhance collection of heat which normally would be wasted and route this collected excess or waste heat to blower 20. In FIG. 6 there is provided an excess heat collection unit 80 for use with a conventional fireplace.

Collection unit 75 provides a double wall casing 82 surrounding a conventional fireplace. Air intakes 83 are provided through which air would be pulled by the force of blower 20 into the inner wall and thereafter drawn through openings 87 into double flue 84. Flue 84 provides an inner 84b and outer 84a wall construction having an inner space 85 through which smoke would be exhausted and a hot air space 86 through which clean air would be pulled which would communicate first with opening 83 then passed through openings 87. Thus, heat transfer from the fireplace 81 would be achieved.

FIG. 9 provides a suitable excess heat collection apparatus 100 for use with for example any number of hot air producing appliances such as dryers, range, hoods, and the like. A pair of intake lines 101 are shown in FIG. 9 which would communicate with the discharge portions of a dryer, hood, or like heat producing unit. A plurality of heat conducted plates 102 are provided to collection unit 100, with a plurality of openings 103 provided in each plate 102. An outer casing 104 encapsulates plates 102 leaving a side open to allow the intake of air. A discharge tube 106 is provided which would communicate with blower 20 and discharge heated air thereto. Vent tubes 108 are provided as needed corresponding to each intake tube 101 for each appliance or like device which would produce heat.

Because many varying and different embodiments may be made within the scope of the inventive concept herein taught, and because many modifications may be made in the embodiments herein detailed in accordance with the descriptive requirement of the law, it is to be understood that the details herein are illustrative and not in a limiting sense.

What is claimed as invention is:
1. An air circulation system for generally enclosed structures, as a home, having an interior space defined in part by a slab/floor, said system comprising:
  a. a structurally supportive lightweight aggregate mass subsurface to the slab/floor and structurally communicating with ground support thereunder, said mass forming a structural support for at least a portion of the slab/floor and defining an enlarged void air space between said slab/floor and the underlying ground support;

b. blower means for circulating air between interior space and said void air space;

c. film sheet enveloping said mass for preventing water flow into said mass from the surrounding area; and return air flow conduit means for carrying air from said void air space to said interior space.

2. The apparatus of claim 1 further comprising independent flow control means associated with said return air flow conduit means for balancing air flow between said void air space and said interior space.

3. The apparatus of claim 1 further comprising drain means under said mass and penetrating said film sheet envelope for collecting and draining water which drains by gravity from said mass to said drain means.

4. The apparatus of claim 3 further comprising conduit means associated with said drain means for transmitting water collected by said drain means to a desired point of discharge.

5. The apparatus of claim 1 further comprising heat transfer means associated with said blower means for effecting heat exchange with air discharged by said blower means to said mass.

6. The apparatus of claim 5 wherein said heating transfer means comprises a plurality of heat coils.

7. A support and temperature regulating structural system for use with a generally enclosed structure having at least enclosing walls, a roof and a slab/floor, which structural system comprises:

a. an expanded clay lightweight aggregate mass having void air spaces therein enabling air to pass through said mass;

b. film sheet enveloping said mass for preventing water flow into said mass from the exterior; and c. means adapted to direct a flow of air from the interior of said enclosed structure through a substantial portion of said mass and thence back into the interior of said structure;

said mass being further characterized in that said mass together with its film sheet envelope rests upon and is supported by the ground at the site of said structure and is adapted to communicate with and support a substantial area of the underside of said slab/floor.

8. The system of claim 7 further characterized in that said mass is comprised of a plurality of aggregate particles having a grain size in the range of about 0.5 to about 1 inch.

9. The system of claim 7 further characterized in that less than one half (½) of the volume of said mass is solid material, the balance of the volume being an enlarged continuous void air space.

10. The system of claim 7 further characterized in that the ground upon which said mass together with its film sheet envelope rests includes an upper layer of sand.

11. An aerated thermal cap air circulation apparatus for generally enclosed structures, as a home, said apparatus comprising:

a. a generally enclosed structure having exterior wall and roof portions which define an interior to be heated or cooled;

b. continuous slab means extending over a ground surface for supporting at least in part said generally enclosed structure; said slab means having a floor area which during use communicates with said interior;

c. structurally supportive air circulation medium means subsurface to said slab means and structurally communicating with an underlying earth for forming a structural support to said slab means;

d. an enlarged continuous void air space formed between said slab means and the underlying earth, said air space being occupied partially by said air circulation medium means;

e. envelope means surrounding said air circulation medium means for confining air flow to said void air space;

f. blower means for circulating air between said structure interior and said void air space; and g. return air flow conduit means communicating between said void air space and said interior for balancing air flow between said void air space and said structure interior.

12. The aerated thermal cap air circulation apparatus of claim 11 further comprising supplemental heat transfer means for transferring heat between said heat transfer means and to the air contained within said void air space.

13. The aerated thermal cap air circulation apparatus of claim 11 wherein said air circulation medium means comprises at least in part an aggregate mass.

14. The aerated thermal cap air circulation apparatus of claim 13 wherein said aggregate mass is an expanded clay lightweight aggregate mass.

15. The aerated thermal cap air circulation apparatus of claim 11 wherein said air circulation medium means occupies less than one half (½) by volume of said enlarged continuous void air space.

16. The aerated thermal cap air circulation apparatus of claim 11 wherein said envelope means is film sheet surrounding said air circulation medium means.

17. The aerated thermal cap air circulation apparatus of claim 11 wherein said air circulation medium means is comprised of a plurality of aggregate particles of expanded clay lightweight aggregate occupying partially said void air space formed between slab means and the underlying earth, each of said particles being closely contacted with one another to form an aggregate of structural support of said slab means.

18. The aerated thermal cap air circulation apparatus of claim 11 wherein there is further provided heat transfer coils associated with said blower means for transferring heat between said coils and air flow through said blower means.

19. The aerated thermal cap air circulation apparatus of claim 11 further comprising filtration means for filtering air flowing through said air circulation medium means.

20. The aerated thermal cap air circulation apparatus of claim 19 wherein said filtration means comprises an activated charcoal content added to said air circulation medium means.

21. The aerated thermal cap air circulation apparatus of claim 11 wherein said air circulation medium means is a mass of an expanded lightweight aggregate as specified in ASTM designation C331-64T.

22. The aerated thermal cap air circulation apparatus of claim 11 wherein air circulation medium means is mass of an expanded clay lightweight aggregate as specified in ASTM designation C330-68T.

23. An aerated thermal cap air circulation apparatus for generally enclosed structures, as a home, said apparatus comprising:

a. continuous slab means extending over a ground surface for supporting at least in part said generally enclosed structure; said slab means having a floor area which during use communicates with the interior of said structure, said slab means having a generally centrally positioned opening therethrough extending between the upper and lower surface of said slab means;

b. structurally supportive air circulation medium means subsurface to said slab means and structurally communicating with an underlying earth for forming a structural support to said slab means;

c. an enlarged continuous void air space formed between said slab means and the underlying earth, said air space being occupied partially by said air circulation medium means;

d. envelope means surrounding said air circulation medium means for confining air flow to and excluding water flow into said void air space;

e. blower means for circulating air between said structure interior and said void air space, said blower means directing the circulating air from said interior through said opening in said slab means and into a generally centrally positioned portion of said void air space; and f. conduit means for transmitting air flow from generally peripheral portions of said void air space to generally peripheral portions of said structure interior.

24. The aerated thermal cap air circulation apparatus of claim 23 wherein said air circulation medium means comprises at least in part an aggregate mass.

25. The aerated thermal cap air circulation apparatus of claim 24 wherein said aggregate mass is an expanded clay lightweight aggregate mass.

26. The aerated thermal cap air circulation apparatus of claim 25 wherein said aggregate mass occupies less than one half (½) by volume of said enlarged continuous void air space.

27. The aerated thermal cap air circulation apparatus of claim 23 wherein said air circulation medium means comprises an expanded clay lightweight aggregate mass which occupies less than one half (½) by volume of said enlarged continuous void air space and wherein said envelope means is plastic film sheet surrounding said air circulation medium means.

28. The aerated thermal cap air circulation apparatus of claim 23 wherein there is further provided heat transfer means associated with said blower means for transferring heat between said heat transfer means and air flow through said blower means.

29. The aerated thermal cap air circulation apparatus of claim 23 further characterized in that said conduit means introduce the air flow from said void air space inwardly to generally peripheral portions of said structure interior at peripheral locations in said interior above but in proximity to said floor area.

30. The aerated thermal cap air circulation apparatus of claim 23 further characterized in that
(i) said slab means is a concrete slab;
(ii) said air circulation medium means is an expanded clay lightweight aggregate mass comprised of a plurality of aggregate particles having a grain size between about 0.5 and about 1 inch;
(iii) said envelope means is plastic film sheet surrounding said aggregate mass;
(iv) said conduit means introduce the air flow from said void air space inwardly to generally peripheral portions of said structure interior at peripheral locations in said interior above but in proximity to said floor area; and
(v) said aerated thermal cap air circulation apparatus further includes heat transfer means associated with said blower means for effecting heat exchange between said heat transfer means and air flow through said blower means.

* * * * *

UNITED STATES PATENT AND TRADEMARK OFFICE
CERTIFICATE OF CORRECTION

PATENT NO. : 4,505,325
DATED : MARCH 19, 1985
INVENTOR(S) : HERVIN J. BERGERON, JR.

It is certified that error appears in the above-identified patent and that said Letters Patent is hereby corrected as shown below:

Column 1, line 51, "that" (both occurrences) should be deleted.

Column 3, line 18, reads "soles" and should read -- solves --.

Column 3, line 23, reads "inventon" and should read -- invention --.

Column 4, line 16, reads "transfer which" and should read -- transfer system which --.

Column 4, line 20, reads "generaly" and should read -- generally --.

Column 5, line 23, reads "of Fig 6A" and should read -- of Fig 6 --.

Column 5, line 36, reads "provides" and should read -- provide --.

Column 5, line 40, reads "portions a" and should read -- portions, a --.

Column 6, line 51, reads "or plastic" and should read -- plastic --.

Column 9, line 1, reads "between interior" and should read -- between said interior --.

Column 9, line 6, indent the entire line and before "return" insert -- d. --.

UNITED STATES PATENT AND TRADEMARK OFFICE
CERTIFICATE OF CORRECTION

PATENT NO. : 4,505,325          Page 2 of 2

DATED      : MARCH 19, 1985

INVENTOR(S): HERVIN J. BERGERON, JR.

It is certified that error appears in the above-identified patent and that said Letters Patent is hereby corrected as shown below:

Column 9, line 24, reads "said heating" and should read -- said heat --.

Column 9, line 25, reads "heat coils" and should read -- heating coils --.

Column 10, line 41, reads "of said slab" and should read -- to said slab --.

Column 10, line 60, reads "wherein air" and should read -- wherein said air --.

Column 10, line 61, reads "mass" and should read -- a mass --.

Column 11, line 5, reads "surface of" and should read -- surfaces of --.

Signed and Sealed this

Sixth Day of May 1986

[SEAL]

Attest:

DONALD J. QUIGG

Attesting Officer      Commissioner of Patents and Trademarks